Sept. 12, 1933.    M. F. SENG    1,926,635
DRILL BIT
Filed Nov. 19, 1932
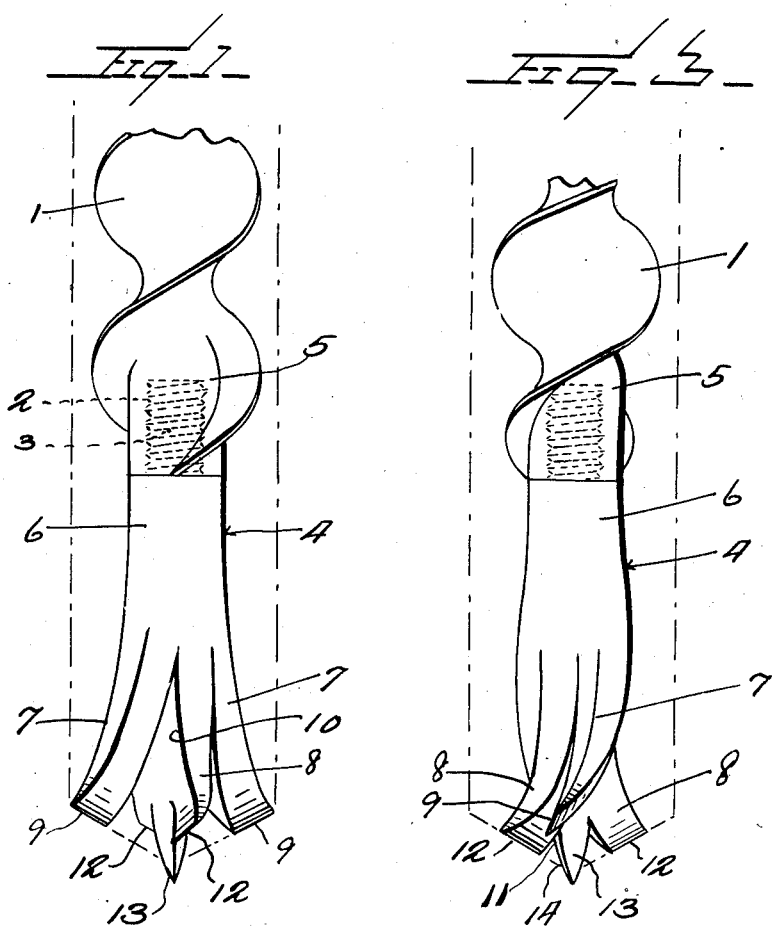
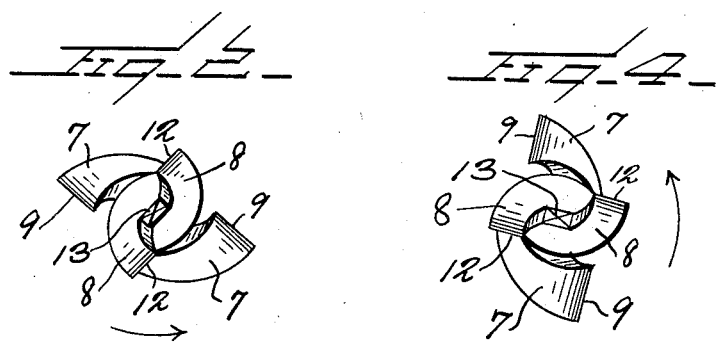
Inventor
M. F. Seng
By Watson E. Coleman
Attorney Patented Sept. 12, 1933

1,926,635

UNITED STATES PATENT OFFICE 1,926,635

DRILL BIT

Matthew F. Seng, Monongahela, Pa., assignor of one-half to Frank J. McWade, Dormont, Pa.

Application November 19, 1932
Serial No. 643,493

2 Claims. (Cl. 255—69)

This invention relates to improvements in drills or augers and pertains particularly to a drill designed for use in coal mines.

The primary object of the present invention is to provide a drill bit formed in a solid piece and so designed as to eliminate frictional contact with the wall of the drilled hole except at those points of the bit which are actually cutting into the mineral.

Another object of the invention is to provide an improved cast or forged drill bit having a cutting centering tip or point at its head whereby better directional control of the same, and the auger to which it is connected, will be had by the operator.

Still another object of the invention is to provide a drill bit and auger in which the bit is formed to cut a bore of greater diameter than the auger so that the bore or hole will not become choked by the cuttings but may be freely moved out by the auger.

A still further object of the invention is to provide an improved cast or forged drill bit adapted to be detachably coupled with an auger and formed at its forward or head end to provide a plurality of outwardly flared cutting blades which together with a centering tip form a cone-shaped bottom in a drill hole, which cutting operation permits of the more ready cutting away of the substance being drilled and the formation of the cutting blades giving a bore of greater width than the auger so that the binding or frictional engagement of the auger in the bore is prevented.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the bit and auger embodying the present invention, viewing the same from the side of the lowermost cutting blades;

Figure 2 is a view in end elevation of the bit in the position shown in Figure 1;

Figure 3 is a view in side elevation of the bit and auger viewing the bit from the side upon which the upper ones of the cutting blades are located;

Figure 4 is a view in bottom plan of the auger shown in the position of Figure 3.

Referring now more particularly to the drawing wherein like numerals of reference indicate corresponding parts throughout the several views, the numeral 1 indicates generally a portion of the forward end of an auger, which forward end is provided with an interiorly threaded socket 2 into which the threaded stem portion 3 of the bit embodying the present invention is mounted. The bit is indicated as a whole by the numeral 4.

As is clearly shown the lower end of the auger 1 which has the relatively flat pitched spirals, terminates in a cylindrical portion 5 in which the threaded bore 2 is formed. The rear end of the bit 4 is also of cylindrical cross section, as indicated at 6 and is of the same overall diameter as the portion 5 of the auger so that when the bit is mounted on the auger the abutting portions will have their surfaces flush and no edges or shoulders will remain which will contact with the material which is drilled away and thus retard the forward movement of the auger.

The forward or head end of the drill bit is formed to provide the outer blades 7 and the inner blades 8. These outer blades 7 extend forwardly and flare laterally as shown and they are also longitudinally curved so that the cutting edges 9 thereof are directed circumferentially of the auger and in the direction of rotation of the same and the bit.

As is clearly shown the cutting edges of the outer blades 7 are formed by gradually tapering or decreasing the thickness of the blades to the free ends thereof and the edges 9 extend in lines running obliquely of the longitudinal axis of the drill bit and crossing upon the line thereof.

The inner blades 8 are formed from a portion 10 of the bit which is located between the blades 7 and this portion is turned so that its lower end extends substantially in a plane at right angles to the plane occupied by the blades 7 and has the blades 8 formed therefrom. The blades 8 flare outwardly as shown in Figure 3 so that there is formed therebetween a crotch 11, and they are longitudinally curved so that their cutting edges 12 are directed substantially in the direction of rotation of the bit like the edges 9 of the outer blades 7.

Integral with the center part 10 of the bit from which the blades 8 are formed, is a centering spur or point 13 which extends downwardly from the crotch 11 between the blades 8 and terminates slightly below the lowest points of the blades between which it positions.

The edges 12 of the blades 8 are disposed to extend in a line oblique to the longitudinal axis of the bit and auger and coact with the edges 9 of the outer blades to form a cone-like bottom for the drilled hole.

The centering spur or tip 13 is turned or twisted slightly on its long axis so as to present cutting edges 14.

From the foregoing it will be readily apparent that an auger equipped with a drill bit of the character herein described can be readily driven into a body of coal or any other body of mineral as the bit upon the forward end thereof cuts a bore of a materially greater diameter than the auger thereby preventing any binding of the auger in the hole.

Due to the peculiar formation and disposition of the cutting blades a more rapid cutting action is obtained than with other types of bits and in addition the provision of the centering tip or spur between the forward inner blades 8 enables the operator to keep the drill moving along a straight line or, in other words, properly centered.

Having thus described the invention what is claimed is:—

1. A drill bit for coal or other minerals, comprising an elongated body formed at one end to provide an outer pair of cutting blades and an inner pair of cutting blades, said outer pair of blades being diametrically oppositely disposed and flaring outwardly from the body at their free ends and further being curved to have their free ends directed in the direction of rotation of the bit, the said free ends being sharpened to provide cutting edges, said inner blades extending downwardly from between the outer blades and having their free ends sharpened to provide cutting edges and further flared to extend laterally in a plane substantially at right angles to the plane of the outer blades, said inner blades being curved to have their cutting edges directed in the direction of rotation of the bit, and a centering point extending longitudinally of the bit between the inner blades and projecting beyond the same.

2. A drill bit for coal or other minerals, comprising an elongated body formed at one end to provide an outer pair of cutting blades and an inner pair of cutting blades, said outer pair of blades being diametrically oppositely disposed and flaring outwardly from the body at their free ends and further being curved to have their free ends directed in the direction of rotation of the bit, the said free ends being sharpened to provide cutting edges, said inner blades extending downwardly from between the outer blades and having their free ends sharpened to provide cutting edges and further flared to extend laterally in a plane substantially at right angles to the plane of the outer blades, said inner blades being curved to have their cutting edges directed in the direction of rotation of the bit, a centering point extending longitudinally of the bit between the inner blades and projecting beyond the same, said blades having their edges disposed at an oblique angle to the length of the bit and arranged so that projections of said edges meet at a common point on the longitudinal center of the bit, and said inner blades being positioned in advance of the outer blades.

MATTHEW F. SENG.